United States Patent
Swanson et al.

(10) Patent No.: US 10,434,719 B2
(45) Date of Patent: Oct. 8, 2019

(54) MAGNETICALLY COUPLED PRINT HEAD FOR ADDITIVE MANUFACTURING SYSTEM

(71) Applicant: Stratasys, Inc., Eden Prairie, MN (US)

(72) Inventors: William J. Swanson, St. Paul, MN (US); Alfredo Santiago, Jr., Andover, MN (US); Joseph LaBossiere, Rogers, MN (US); Kevin Johnson, Minneapolis, MN (US); Nathan Joseph Knutson, Long Lake, MN (US)

(73) Assignee: STRATASYS, INC., Eden Prairie, MN (US)

( * ) Notice: Subject to any disclaimer, the term of this patent is extended or adjusted under 35 U.S.C. 154(b) by 233 days.

(21) Appl. No.: 15/491,436

(22) Filed: Apr. 19, 2017

(65) Prior Publication Data

US 2017/0297321 A1 Oct. 19, 2017

Related U.S. Application Data

(60) Provisional application No. 62/324,636, filed on Apr. 19, 2016.

(51) Int. Cl.
*B29C 64/40* (2017.01)
*B29C 64/386* (2017.01)
*B33Y 30/00* (2015.01)
*B33Y 50/02* (2015.01)

(52) U.S. Cl.
CPC ............ *B29C 64/40* (2017.08); *B29C 64/386* (2017.08); *B33Y 30/00* (2014.12); *B33Y 50/02* (2014.12)

(58) Field of Classification Search
CPC .............................. B29C 64/40; B29C 64/386
See application file for complete search history.

(56) References Cited

U.S. PATENT DOCUMENTS

| | | | |
|---|---|---|---|
| 2,583,523 A | * | 1/1952 | Winther ............... H02K 49/065 310/103 |
| 6,004,124 A | | 12/1999 | Swanson et al. |
| 6,722,872 B1 | | 4/2004 | Swanson et al. |
| 7,063,285 B1 | | 6/2006 | Turley et al. |
| 7,127,309 B2 | | 10/2006 | Dunn et al. |
| 7,604,470 B2 | | 10/2009 | LaBossiere et al. |
| 7,625,200 B2 | | 12/2009 | Leavitt |

(Continued)

FOREIGN PATENT DOCUMENTS

WO 2016014543 A 1/2016

*Primary Examiner* — Matthew J Daniels
*Assistant Examiner* — Asha A Thomas
(74) *Attorney, Agent, or Firm* — Westman, Champlin & Koehler, P.A.

(57) ABSTRACT

An additive manufacturing system includes a gantry configured to move in a build plane. A platen is configured to support a part being built in a layer by layer process and wherein the platen is configured to move in a direction substantially normal to the build plane. A head carriage is carried by the gantry wherein the head carriage includes ferromagnetic material. The system includes at least one print head where the print head includes a housing and one or more magnets attached to the housing wherein the at least one print head is configured to be coupled to the head carriage through a magnetic coupling between the one or more magnets and the ferromagnetic material such that the print head is configured to move rotationally relative to the head carriage.

19 Claims, 9 Drawing Sheets

(56) References Cited

U.S. PATENT DOCUMENTS

| | | |
|---|---|---|
| 7,938,356 B2 | 5/2011 | Taatjes et al. |
| 8,403,658 B2 | 3/2013 | Swanson |
| 8,439,665 B2 | 5/2013 | Batchelder et al. |
| 8,985,497 B2 | 3/2015 | Mannella et al. |
| 9,073,263 B2 | 7/2015 | Mannella et al. |
| 9,108,360 B2 | 8/2015 | Comb et al. |
| 2012/0164256 A1* | 6/2012 | Swanson ................ B29C 41/52 425/162 |
| 2015/0096717 A1 | 4/2015 | Batchelder et al. |
| 2015/0097053 A1 | 4/2015 | Batchelder et al. |

* cited by examiner

MAGNETICALLY COUPLED PRINT HEAD FOR ADDITIVE MANUFACTURING SYSTEM

CROSS REFERENCE TO RELATED APPLICATION(S)

This application claims the benefit of U.S. Provisional Patent Application Ser. No. 62/324,636 entitled MAGNETICALLY COUPLED PRINT HEAD FOR ADDITIVE MANUFACTURING SYSTEM that was filed on Apr. 19, 2016, the contents of which are incorporated by reference in its entirety.

BACKGROUND

The present disclosure relates to additive manufacturing systems for printing three-dimensional (3D) parts and support structures. In particular, the present disclosure relates to support materials for use in additive manufacturing systems, consumable assemblies retaining the support materials, and methods of manufacturing and using the support materials and assemblies in additive manufacturing systems to print articles.

Additive manufacturing is generally a process in which a three-dimensional (3D) object is manufactured utilizing a computer model of the objects. The basic operation of an additive manufacturing system consists of slicing a three-dimensional computer model into thin cross sections, translating the result into two-dimensional position data, and feeding the data to control equipment which manufacture a three-dimensional structure in a layerwise manner using one or more additive manufacturing techniques. Additive manufacturing entails many different approaches to the method of fabrication, including fused deposition modeling, ink jetting, selective laser sintering, powder/binder jetting, electron-beam melting, electrophotographic imaging, and stereolithographic processes.

In a fused deposition modeling additive manufacturing system, a printed part may be printed from a digital representation of the printed part in a layer-by-layer manner by extruding a flowable part material along toolpaths. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a printed part resembling the digital representation.

In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited from a second nozzle pursuant to the generated geometry during the printing process. The support material adheres to the part material during fabrication, and is removable from the completed printed part when the printing process is complete.

SUMMARY

An aspect of the present disclosure relates to an additive manufacturing system that includes a gantry where the gantry configured to move in a build plane. The system includes a platen and has a build surface that is substantially parallel to the build plane, where the platen is configured to support a part being built in a layer by layer process and wherein the platen is configured to move in a direction substantially normal to the build plane. A head carriage is carried by the gantry, wherein the head carriage includes ferromagnetic material. The system includes at least one print head where the print head includes a housing and one or more magnets attached to the housing wherein the at least one print head is configured to be coupled to the head carriage through a magnetic coupling between the one or more magnets and the ferromagnetic material such that the print head is configured to move rotationally relative to the head carriage.

Another aspect of the present disclosure relates to an additive manufacturing system having a gantry configured to move in a build plane. The system includes a platen that is configured to support a part being built in a layer by layer process, wherein the platen is configured to move in a direction substantially normal to the build plane. The additive manufacturing system includes a head carriage carried by the gantry wherein the head carriage has a wall having an opening sized to one or more print heads. The head carriage includes a first shaft, compositionally at least partially ferromagnetic material, secured thereto wherein the first shaft is located below the opening. The head carriage includes a second shaft spaced from the first shaft, where the second shaft is secured to the head carriage below the opening. The system includes at least one print head where the print head includes a housing and one or more magnets attached to the housing wherein the at least one print head is configured to be coupled to the head carriage through a magnetic coupling between the one or more magnets and the ferromagnetic material such that the print head is configured to move rotationally relative to the head carriage.

The system may include a second print head having a second housing and one or more magnets attached to the second housing wherein the second print head is configured to be coupled to the head carriage through a magnetic coupling between the one or more magnets and the ferromagnetic material such that the second print head is configured to move rotationally relative to the head carriage. The magnetic coupling of the first and second print heads to the first shafts allows the first and second print heads to be positioned side by side.

Another aspect of the present disclosure relates to an additive manufacturing system having a gantry that is configured to move in a build plane. The system includes a platen that is configured to support a part being built in a layer by layer process, wherein the platen is configured to move in a direction substantially normal to the build plane. The additive manufacturing system includes a head carriage carried by the gantry wherein the head carriage comprises a wall having an opening having a length and a width, the opening is sized to receive two or more print heads. The head carriage includes a first shaft, compositionally at least partially ferromagnetic material, located below a bottom wall. The head carriage includes a second shaft spaced from the first shaft, where the second shaft is located below the bottom wall. The system includes at least one print head having a housing with a front end and a back end. The back end is configured to be positioned proximate the bottom wall when the print head is secured to the head carriage, where the housing has spaced apart rotational bearing surfaces between the front end and the back end. The rotational bearing surfaces are configured to engage the first shaft such that a pitch of the at least one print head relative to the head carriage can be manipulated. The print head includes one or more magnets attached to the housing between the spaced apart rotational bearing surfaces wherein the at least one print head is configured to be coupled to the head carriage through a magnetic coupling between the one or more magnets and the first shaft. The at least one print head is configured to be removed from the head carriage by applying a force proximate the front end to rotate the at least one print head about the first shaft while maintaining the magnetic coupling until the back end of the housing engages the bottom wall of the print housing and wherein additional force separates the magnets from the first shaft such that the at least one print head can be removed from the head carriage.

DEFINITIONS

Unless otherwise specified, the following terms as used herein have the meanings provided below.

The terms "preferred", "preferably", "example" and "exemplary" refer to embodiments of the invention that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In some of the embodiments shown below, the layer-printing direction is along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The terms "about" and "substantially" are used herein with respect to measurable values and ranges due to expected variations known to those skilled in the art (e.g., limitations and variabilities in measurements).

All patents, publications or other documents mentioned herein are incorporated by reference.

DETAILED DESCRIPTION

Figure 1:
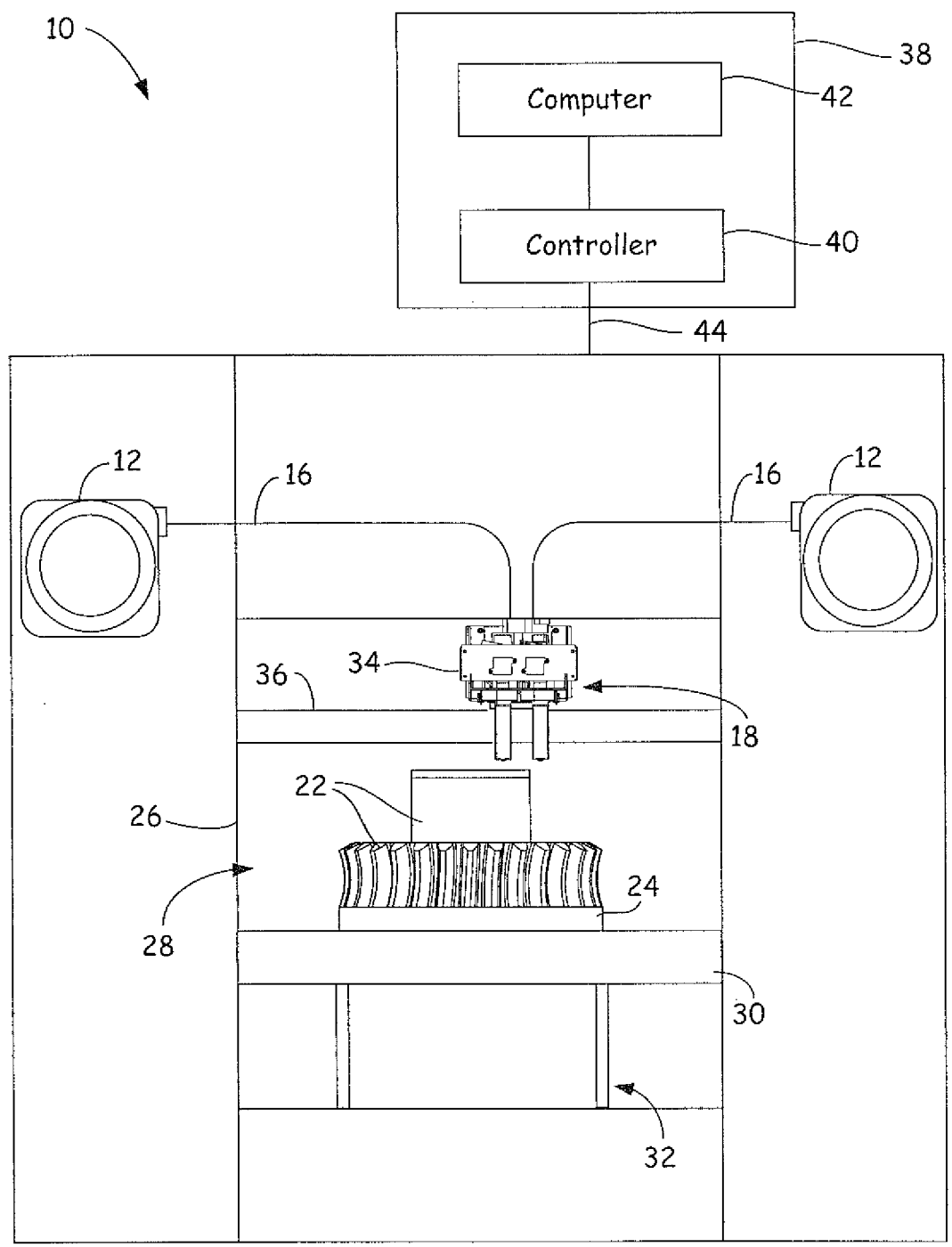
FIG. 1 is a schematic view of an additive manufacturing system of the present disclosure.

The present disclosure relates to a mechanism for mounting a print head on a head carriage carried by a gantry of an additive manufacturing system. The present disclosure includes utilizing a magnetic coupling along with an interface that includes a rigid rotational bearing surface between a print head and selected portions of the head carriage. The present disclosures utilizes an actuator to change a pitch of the print head relative to the head carriage from an active, extruding position to a passive, non-extruding position through movement of the rotational bearing about the head carriage.

The present disclosure provides many advantages over receptacle based retaining systems that utilized a physical interference fit to mount the print head to the carriage. The present disclosure provides a much simpler design that leads to more reliability. Further, because the complexity is lessened there are less components and no precision components relative to the prior receptacle based designs, which results in a less costly and more reliable interface between the print head and the head carriage.

Further, because the present disclosure utilizes a magnetic coupling along with a rotational bearing there is no need for the receptacle to retain the print head, which has side walls. In the prior art receptacle based retaining systems, when two print heads are positioned side to side, the adjacent side walls of the receptacles displace the print heads from each other at least a distance of a thickness of the two adjacent side walls. Beneficially, the present disclosure allows for the multiple print heads to be positioned close to each other, or side by side, because a receptacle is not required to mount the print head to the head carriage. Otherwise stated, a packing density of the print heads utilizing the disclosed mounting mechanism is much higher relative to the prior receptacle style designs.

The present disclosure utilizes an actuator along with a magnetic coupling and a rotational bearing to move the print head from an active, extruding position to the passive, non-extruding position. Therefore, the present disclosure has no wear components, which leads to increased reliability and less maintenance.

Also relative to prior print head securing mechanisms, there are minimal parts resulting in the print head and the head carriage having a much lower mass. A lower mass allows for a more reliable and accurate build of a 3D part relative to print heads and carriages with a higher mass when utilizing the same gantry. Further, the print head and carriage of the present disclosure can be positioned close to the head carriage because they have a low profile. This low profile configuration results in a lower center of gravity of the print head relative to a plane of movement of the gantry. The closer the center of gravity is to the gantry, the higher the stability of the print head relative to the head carriage when moved in the build plane.

The present disclosed interface between the print head and the carriage can be utilized in any new additive manufacturing system. Further, prior additive manufacturing systems can be retrofitted to utilize the disclosed head carriage and print head(s).

The present disclosure may be used with any suitable extrusion-based additive manufacturing system. For example, FIG. 1 illustrates a system 10 that has a substantially horizontal print plane where the part being printed in indexed in a substantially vertical direction as the part is printed in a layer by layer manner using two print heads 18. The illustrated system 10 uses two consumable assemblies 12, where each consumable assembly 12 is an easily loadable, removable, and replaceable container device that retains a supply of a consumable filament for printing with system 10. Typically, one of the consumable assemblies 12 contains a part material filament, and the other consumable assembly 12 contains a support material filament, each supplying filament to one print head 18. However, both consumable assemblies 12 may be identical in structure. Each consumable assembly 12 may retain the consumable filament on a wound spool, a spool-less coil, or other supply arrangement, such as discussed in Swanson et al., U.S. Pat. No. 8,403,658; Turley et al. U.S. Pat. No. 7,063,285; Taatjes at al., U.S. Pat. No. 7,938,356; and Mannella et al., U.S. Pat. Nos. 8,985,497 and 9,073,263.

Each print head 18 is an easily loadable, removable and replaceable device comprising a housing 80 that retains a liquefier assembly 20 having a nozzle tip 14. Each print head 18 is configured to receive a consumable material, melt the material in liquefier assembly 20 to product a molten material, and deposit the molten material from a nozzle tip 14 of liquefier assembly 20. Examples of suitable liquefier assemblies for print head 18 include those disclosed in Swanson et al., U.S. Pat. No. 6,004,124; LaBossiere, et al., U.S. Pat. No. 7,604,470; Leavitt, U.S. Pat. No. 7,625,200; and Batchelder et al., U.S. Pat. No. 8,439,665. Other suitable liquefier assemblies include those disclosed in U.S. Patent Publications Nos. 2015/0096717 and 2015/0097053; and in PCT publication No. WO2016014543A.

Guide tube 16 interconnects consumable assembly 12 and print head 18, where a drive mechanism of print head 18 (or of system 10) draws successive segments of the consumable filament from consumable assembly 12, through guide tube 16, to liquefier assembly 20 of print head 18. In this embodiment, guide tube 16 may be a component of system 10, rather than a sub-component of consumable assemblies 12. In other embodiments, guide tube 16 is a sub-component of consumable assembly 12, and may be interchanged to and from system 10 with each consumable assembly 12. During a build operation, the successive segments of consumable filament that are driven into print head 18 are heated and melt in liquefier assembly 20. The melted material is extruded through nozzle tip 14 in a layerwise pattern to produce printed parts.

Exemplary system 10 is an additive manufacturing system for printing 3D parts or models and corresponding support structures (e.g., 3D part 22 and support structure 24) from the part and support material filaments, respectively, of consumable assemblies 12, using a layer-based, additive manufacturing technique. Suitable additive manufacturing systems for system 10 include fused deposition modeling systems developed by Stratasys, Inc., Eden Prairie, Minn. under the trademarks "FDM" and "FORTUS".

As shown, system 10 includes system casing 26, chamber 28, platen 30, platen gantry 32, head carriage 34, and head gantry 36. System casing 26 is a structural component of system 10 and may include multiple structural sub-components such as support frames, housing walls, and the like. In some embodiments, system casing 26 may include container bays configured to receive consumable assemblies 12. In alternative embodiments, the container bays may be omitted to reduce the overall footprint of system 10. In these embodiments, consumable assembly 12 may stand proximate to system casing 26, while providing sufficient ranges of movement for guide tubes 16 and print heads 18 that are shown schematically in FIG. 1.

Chamber 28 is an enclosed environment that contains platen 30 for printing 3D part 22 and support structure 24. Chamber 28 may be heated (e.g., with circulating heated air) to reduce the rate at which the part and support materials solidify after being extruded and deposited (e.g., to reduce distortions and curling). In alternative embodiments, chamber 28 may be omitted and/or replaced with different types of build environments. For example, 3D part 22 and support structure 24 may be built in a build environment that is open to ambient conditions or may be enclosed with alternative structures (e.g., flexible curtains).

Platen 30 is a platform on which 3D part 22 and support structure 24 are printed in a layer-by-layer manner, and is supported by platen gantry 32. In some embodiments, platen 30 may engage and support a build substrate, which may be a tray substrate as disclosed in Dunn et al., U.S. Pat. No. 7,127,309, fabricated from plastic, corrugated cardboard, or other suitable material, and may also include a flexible polymeric film or liner, painter's tape, polyimide tape (e.g., under the trademark KAPTON from E.I. du Pont de Nemours and Company, Wilmington, Del.), or other disposable fabrication for adhering deposited material onto the platen 30 or onto the build substrate. Platen gantry 32 is a gantry assembly configured to move platen 30 along (or substantially along) the vertical z-axis.

Head carriage 34 is a unit configured to receive and retain one or both print heads 18, and is supported by head gantry 36. Head carriage 34 preferably retains each print head 18 in a manner that prevents or restricts movement of the print head 18 relative to head carriage 34 so that nozzle tip 14 remains in the x-y build plane, but allows the print head 18 to be controllably rotated moved nozzle tip 14 out of the x-y build plane (e.g., servoed, toggled, or otherwise switched in a pivoting manner). Head carriage 34 also decreases the likelihood of binding while moving on the head gantry 36. When in active or extruding state, print head 18 is secured in each of the x, y and z planes as well as preventing pitch, roll and yaw relative to the head carriage 34. When in passive or non-extruding state, print head 18 is rotationally moved through the z plane in an arcuate path by changing pitch of print head 18. In further embodiments, print heads 18 and corresponding head carriage 34 may optionally be retrofitted into an existing system 10. In some embodiments, nozzle tip 14 may toggle in the z-direction while print head 18 is secured, providing an optional additional axis of movement.

In the shown embodiment, head gantry 36 is a robotic mechanism configured to move head carriage 34 (and the retained print heads 18) in (or substantially in) a horizontal x-y plane above platen 30. Examples of suitable gantry assemblies for head gantry 36 include those disclosed in Swanson et al., U.S. Pat. No. 6,722,872; and Comb et al., U.S. Pat. No. 9,108,360, where head gantry 36 may also support deformable baffles (not shown) that define a ceiling for chamber 28. Head gantry 36 may utilize any suitable bridge-type gantry or robotic mechanism for moving head carriage 34 (and the retained print heads 18), such as with one or more motors (e.g., stepper motors and encoded DC motors), gears, pulleys, belts, screws, robotic arms, and the like.

In an alternative embodiment, platen 30 may be configured to move in the horizontal x-y plane within chamber 28, and head carriage 34 (and print heads 18) may be configured to move along the z-axis. Other similar arrangements may also be used such that one or both of platen 30 and print heads 18 are moveable relative to each other. Platen 30 and head carriage 34 (and print heads 18) may also be oriented along different axes. For example, platen 30 may be oriented vertically and print heads 18 may print 3D part 22 and support structure 24 along the x-axis or the y-axis.

System 10 also includes controller assembly 38, which may include one or more control circuits (e.g., controller 40) and/or one or more host computers (e.g., computer 42) configured to monitor and operate the components of system 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to system 10.

Controller assembly 38 may communicate over communication line 44 with print heads 18, chamber 28 (e.g., with a heating unit for chamber 28), head carriage 34, motors for platen gantry 32 and head gantry 36, and various sensors, calibration devices, display devices, and/or user input devices. In some embodiments, controller assembly 38 may also communicate with one or more of platen 30, platen gantry 32, head gantry 36, and any other suitable component of system 10. While illustrated as a single signal line, communication line 44 may include one or more electrical, optical, and/or wireless signal lines, which may be external and/or internal to system 10, allowing controller assembly 38 to communicate with various components of system 10.

During operation, controller assembly 38 may direct platen gantry 32 to move platen 30 to a predetermined height within chamber 28. Controller assembly 38 may then direct head gantry 36 to move head carriage 34 (and the retained print heads 18) around in the horizontal x-y plane above chamber 28. Controller assembly 38 may also direct print heads 18 to selectively draw successive segments of the consumable filaments from consumable assembly 12 and through guide tubes 16, respectively.

While, FIG. 1 illustrates a known additive manufacturing system 10 where a build plane is in a substantially horizontal x-y plane and the platen 30 is moved in a z direction substantially normal to the substantially horizontal x-y build plane, the present disclosure is not limited an additive manufacturing system 10 as illustrated in FIG. 1. Rather, the present disclosure including the magnetic coupling of the print head(s) 18 to head gantry 36 and rigid rotational bearing surfaces can be utilized with any additive manufacturing system, including, but not limited to, printing in a substantially vertical print plane and moving the platen in a direction substantially normal to the substantially vertical print plane.

While FIG. 1 illustrates an additive manufacturing system 10 that utilizes a build chamber 28 that can optionally be heated to a selected temperature, the present disclosure is not limited to an additive manufacturing system with a heated chamber or a chamber. Rather, the present disclosure including the magnetic coupling of the print head(s) 18 to head gantry 36 and rigid rotational bearing surfaces can be utilized with any additive manufacturing system, including, but not limited to, additive manufacturing systems that utilize an unheated chamber or an out of oven additive manufacturing system. Otherwise stated, the magnetic coupling of the print head(s) 18 to the head gantry 36 can be utilized on any extrusion-based additive manufacturing system.

Figure 2:
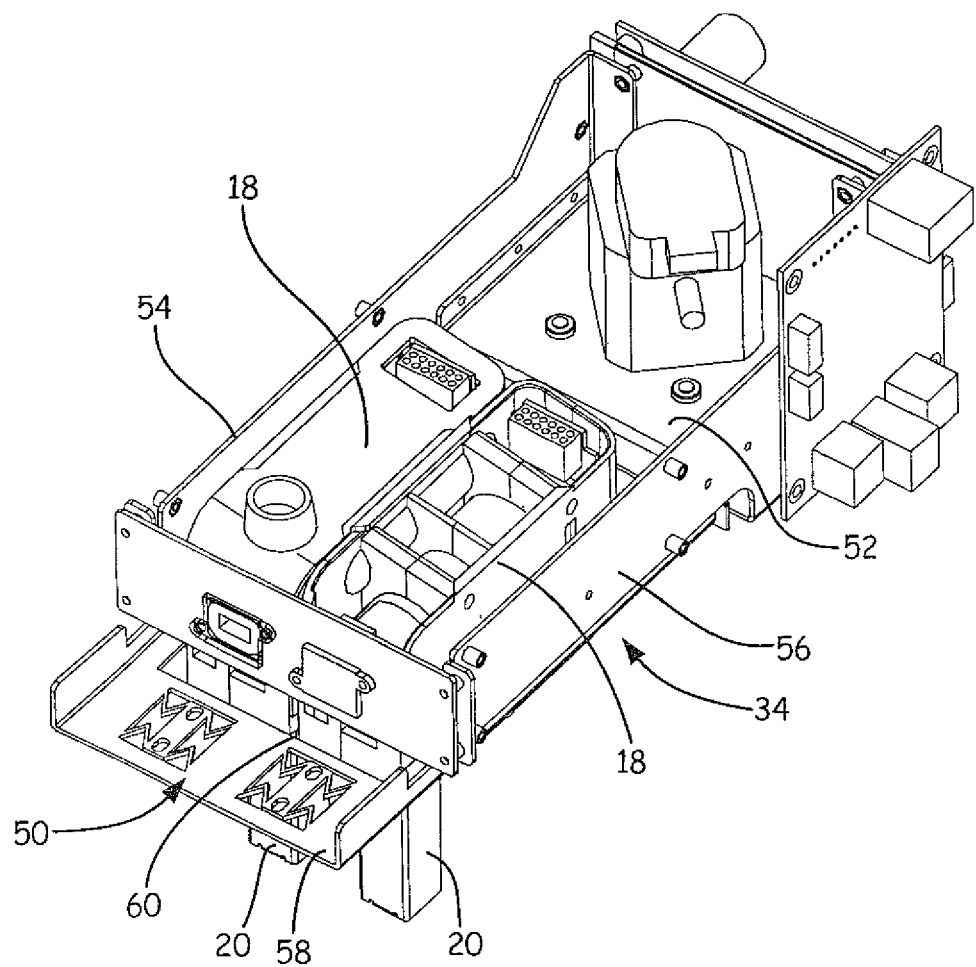
FIG. 2 is a perspective view of a head carriage with two side by side print heads retained therein.
Figure 3:
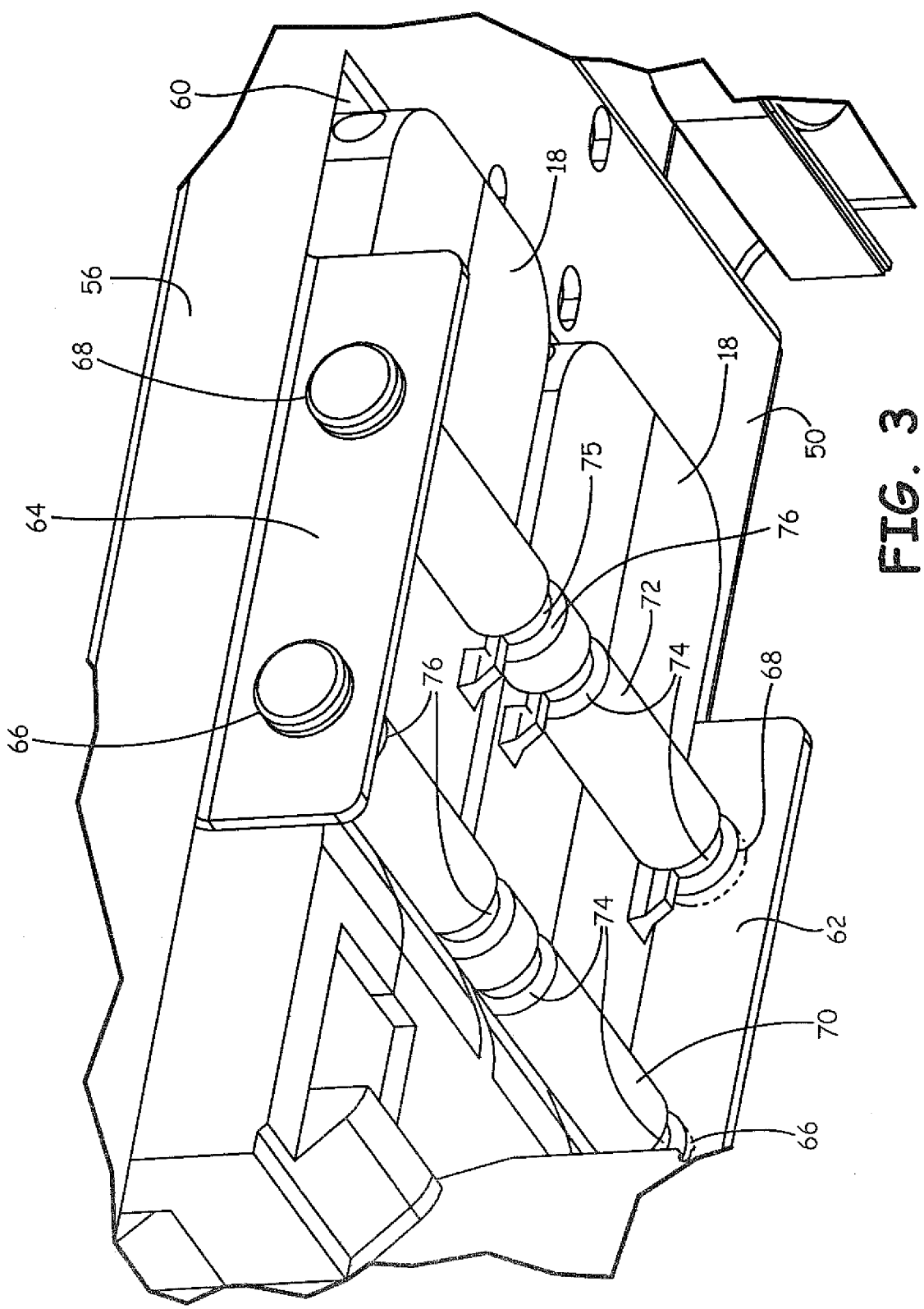
FIG. 3 is a partial perspective view of side by side print heads retained to spaced apart shafts of the head carriage.

Referring to FIGS. 2 and 3, the head carriage 34 of the present disclosure includes bottom wall 50 having rear portion 52, and front portion 58 where bottom wall 50 is substantially planar. Left and right sidewalls 54, 56 are attached to opposing side edges of bottom wall 50. Portions of left and right side walls 54, 56, rear portion 52 and front portion 58 define opening 60 into which print heads 18 can be positioned.

Left and right tabs 62, 64 of the left and right side walls 54, 56, respectively, extend below the bottom wall 50 and include aligned front and back apertures 66, 68. Front shaft 70 is positioned through aligned front apertures 66 and back shaft 72 is positioned through aligned back apertures 68, where front and back shafts 70, 72 are spaced a selected distance apart from each other and are substantially similar in configuration.

Front and back shafts 70, 72 each include first set of v-shaped grooves 74 and second set of v-shape grooves 76 spaced from first set of v-shaped grooves 74, where both sets of grooves 74, 76 extend around a perimeter of shafts 72, 74. The sets of grooves 74, 76 are located around the perimeter of shafts 70, 72 are symmetric about an axis of rotation which allows shafts 70, 72 to be inserted into aligned apertures 66, 68 without having to account for an orientation of shafts 70, 72 within the head carriage 34. While axial symmetric sets of grooves 74 and 76 are disclosed and described, the present disclosure is not limited to axially symmetric sets of grooves 74 and 76. Rather the shafts 70 and 72 could have non-axially symmetric grooves provided the print head(s) 18 can move a sufficient distance to be positioned between the active, extruding position and the passive, non-extruding position through movement of the rotational bearing about the head carriage. It is also contemplated that the shafts 70 and 72 could include sets of raised ridges, including axially symmetric and non-axially symmetric raised ridges, instead of sets of grooves 74, 76.

Further, the sets and grooves 74, 76 are not required for the front shaft 70. However, using the same shaft configuration allows head carriage 34 to utilize a single configuration of the shafts 70, 72, which allows for more ease of construction.

Figure 4:
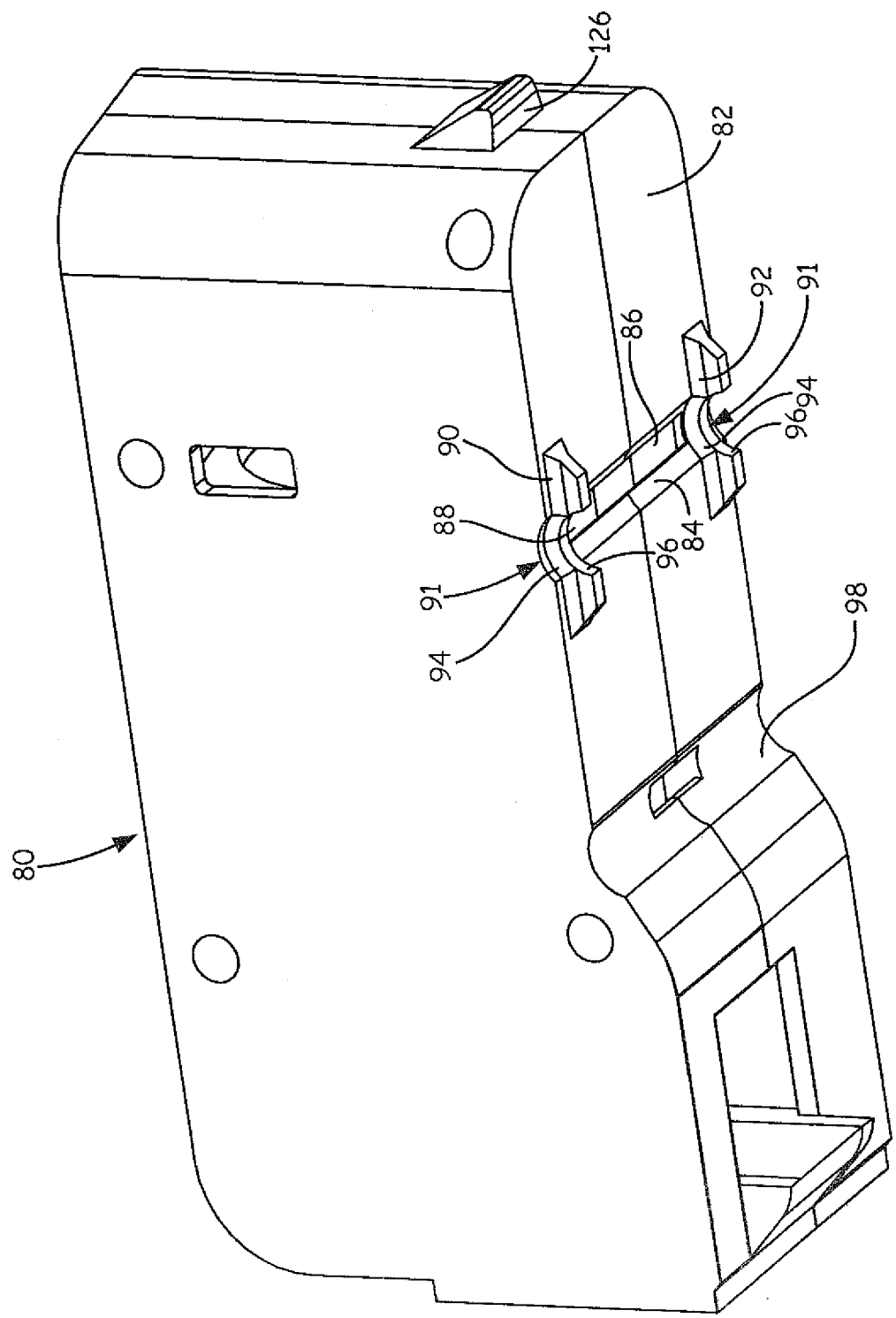
FIG. 4 is a perspective view of a housing of a print head from below.

Referring to FIGS. 3 and 4, bottom head carriage interface surface 82 of housing 80 of print head 18 includes back arcuate groove 84 having a radius substantially similar to that of a radius of back shaft 72. Two spaced apart magnets 86, 88 are embedded in groove 84 and magnetically attract to back shaft 72, which is at least partially constructed of a ferromagnetic material. Magnets 86, 88 are of a sufficient strength magnetically couple print head 18 to back shaft 72 and maintain a magnetic coupling as print head 18 is positioned between the active, extruding position and the passive, non-extruding position. While two magnets 86, 88 are illustrated and described herein, the present disclosure can utilize one or more magnets. Magnets 86, 88 are sufficiently strong to couple and retain print head 18 to shaft 72 in any spatial orientation required in an additive manufacturing system, where common orientations include building in a substantial horizontal build plane and a substantially vertical build plane.

Bottom, head carriage interface surface 82 includes rotational bearings 91, 93 that are spaced apart substantially the same distance as one set of v-shaped grooves 74, 76 such that rotational bearings 91, 93 can be positioned within one set of v-shaped grooves 74 or 76. Extensions 90, 92 extend from bottom, head carriage interface surface 82 and continue rotational bearings 91, 93 to increase a contact area between rotational bearings 91, 93 and shaft 72. The rotational bearings 91, 93 have a complementary configuration to that of the v-shaped grooves 74 or 76 where the engagement of rotational bearings 91, 93 with v-shaped grooves 74 or 76 along with the magnetic coupling between magnets 86, 88 and shaft 72 prevent movement in a x-direction, a y-direction, a z-direction, roll and yaw at the interface between back shaft 72 and bottom surface 82 at groove 84 and extensions 90, 92.

Rotational bearings 91, 93 have concave arcuate surfaces 96 that have a radius substantially similar to a radius of inner surface 75 of v-shaped grooves 74 or 76. Concave arcuate surfaces 96 provide rotational bearing surfaces against inner surface 75 of v-shaped grooves 74 or 76 allowing for a pitch of print head 18 relative to head carriage 34 to be manipulated by linear actuator, as discussed in more detail below.

Bottom, head carriage interface surface 82 includes front arcuate groove 98 having a radius substantially the same as that of a radius of front shaft 70. Front arcuate groove 98 is configured to rest on front shaft 70 when print head 18 is in an active, extruding position. Front shaft 70 provides a positive stop that prevents the pitch of print head 18 from moving a pre-selected pitch relative to head carriage 34, which is typically about zero degrees.

The combination of the magnetic coupling of embedded magnets 86, 88 with back shaft 72, the interaction of rotational bearings 91, 93 with one set of v-shaped grooves 74 or 76, along with the positive stop caused by the interface of front shaft 70 with front groove 98 provides an accurate and secure attachment of the print head 18 to the head carriage 34. The above interactions prevents movement of print head 18 on head carriage 34 in x, y and z directions, roll and yaw with any spatial orientation of the print head 18 and head carriage 34 within system 10.

The present disclosure illustrates two side by side print head 18. However, the present disclosure can be utilized with one print head 18 or more than two print heads 18.

Figure 5:
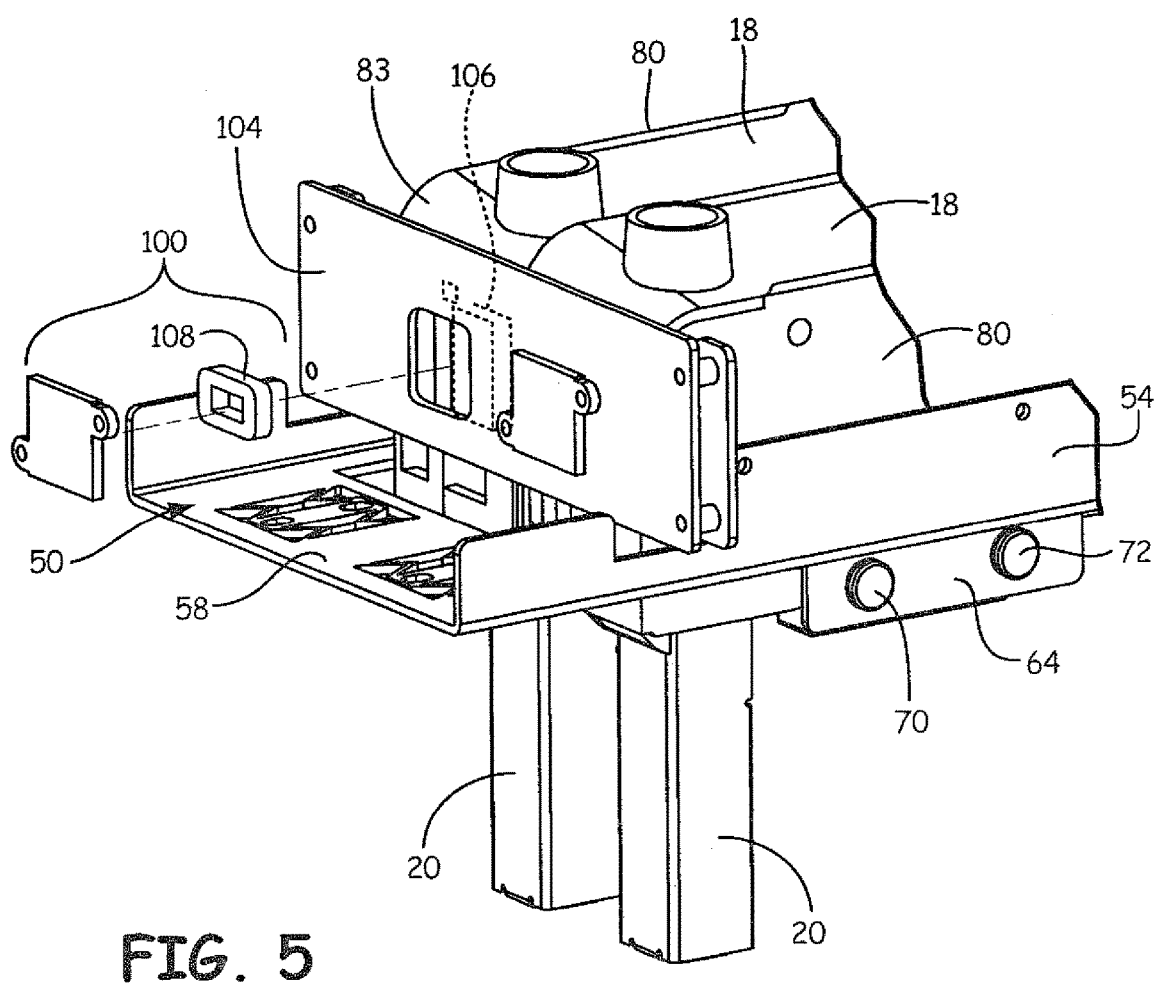
FIG. 5 is a perspective view of the head carriage and retaining print heads in a side by side configuration along with an exploded view of a linear actuator.
Figure 6A:
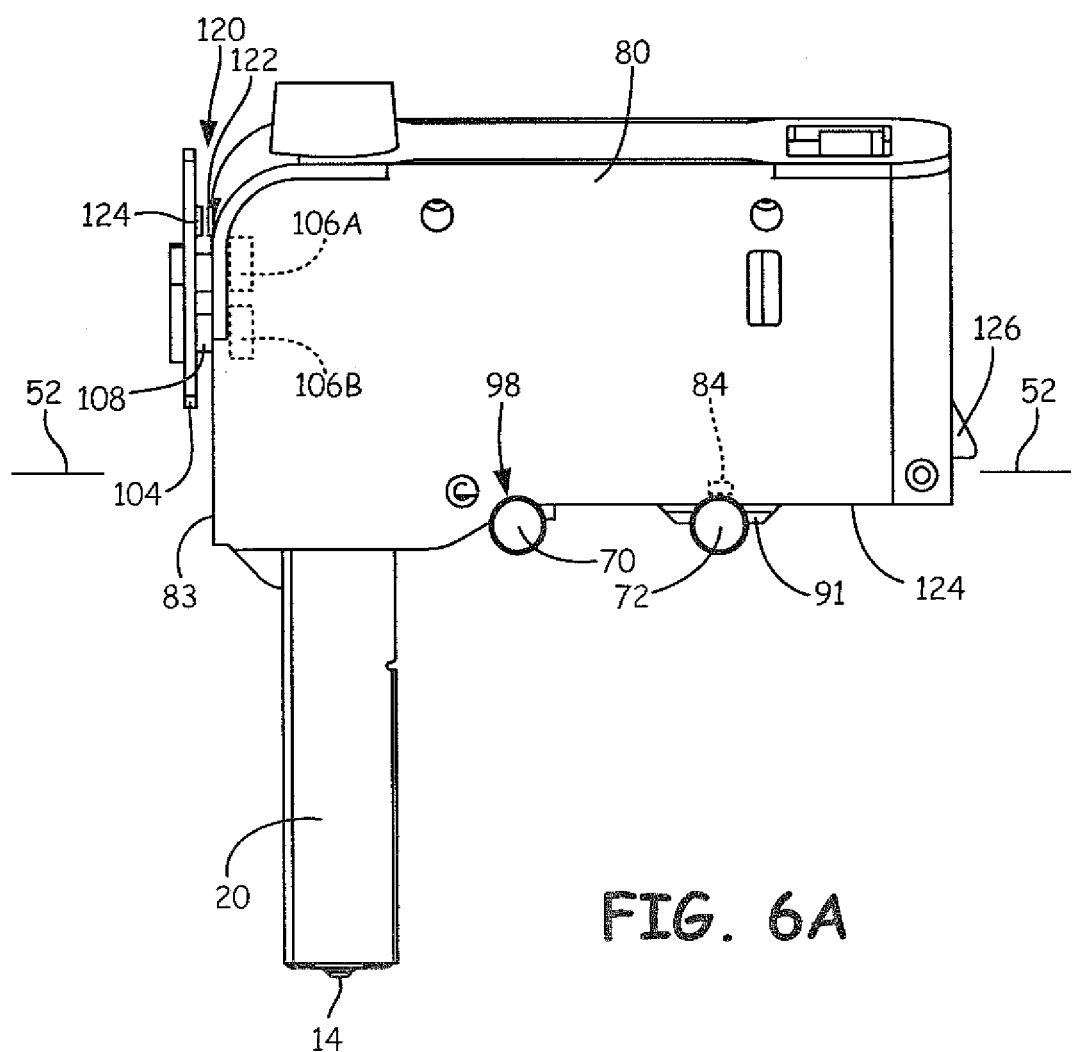
FIG. 6A is a schematic view of a print head in an active, extruding position.
Figure 6B:
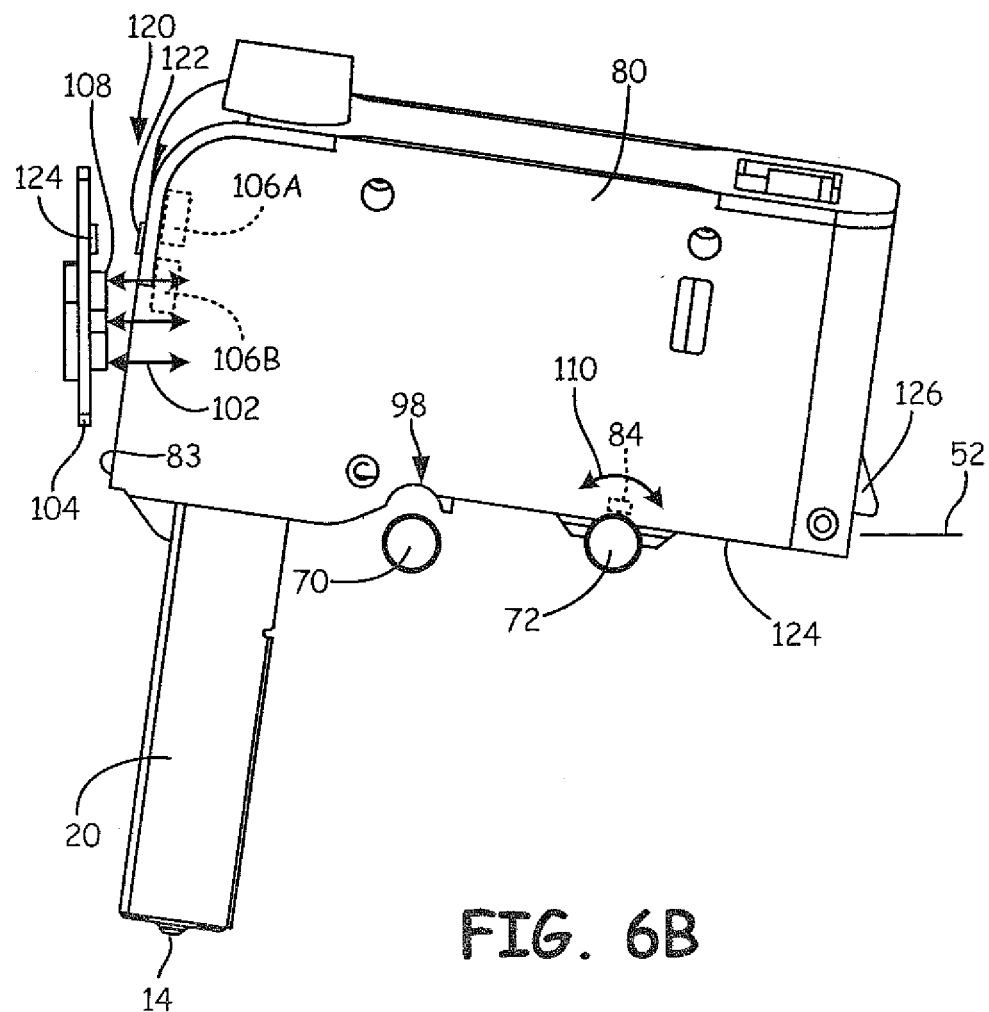
FIG. 6B is a schematic view of a print head in a passive, non-extruding position.

Referring to FIGS. 5-6B, a pitch of print head 18 relative to head carriage 34 is controlled by an actuator 100 that is located proximate front surface 83 of housing 80. The present disclosure utilizes a voice coil actuator as the actuator 100. Voice coil actuator 100 imparts a force on print head 18 in direction of arrows 102 at a height above interface between housing 80 and back shaft 72. The location of the actuator 100 imparts a moment force on print head 18 at interface between housing 80 and back shaft 72 and causes the pitch of print head 18 to change relative to head carriage 34 through rotational movement of arcuate surface 96 on inner surface 75 of one of the set of v-shaped grooves 74 or 76 while magnets 84, 86 maintain a coupling between back shaft 72 and print head 18.

The head carriage 34 includes printed circuit board 104 proximate front surface 83 where printed circuit board 104 is supported by and retained in position on front portion 58 of the bottom wall 50. Permanent magnets 106A and 106B of voice coil actuator 100 secured to front surface 83 of housing 80 and voice coil 108 is mounted to printed circuit board 104. The permanent magnets 106A and 106B have different polarities which allows interaction the voice coil 108 to impart opposite forces on the print head 18 and therefore control the pitch of the print head 18. Mounting voice coil 108 printed circuit board 108 advantageously has non-moving electric and control connections, resulting in lower costs relative to prior actuator designs that utilized moving or flying lead connectors. Similarly, because there are no flying leads, there are no flexation or abrasion issues for the electric leads. Also because there are no moving connectors, the voice coil actuator 100 is more reliable relative to prior voice coils used to move print heads. Additionally, because voice coils 108 are mounted to printed circuit board 104, printed circuit board 104 acts as a heat sink and allows for better cooling of voice coils 108 when power is provided to voice coils 108.

As current is supplied to voice coil 108, the magnet field created by the voice coil 108 interacts with the magnetic field of either of the permanent magnets 106A or 106B and causes a repelling or attracting force in a direction of arrows 102 between voice coil 108 and magnet 106A or 106B depending upon a direction of current through the voice coil 108. Because voice coil actuator 100 is positioned a distance above the magnetic coupling and rotational bearing interface between back shaft 72 and housing 80, a moment force is imparted upon print head 18 and causes print head 18 to rotate in direction of arrows 110 about the rotational bearing interface while magnets 86, 88 maintains the magnetic coupling between back shaft 72 and print head 18 such that a pitch of print head 18 relative to head carriage can be manipulated by linear actuator 100.

When print head 18 is rotated about the rotational bearing interface, front arcuate groove 98 is lifted from front shaft 70 causing the pitch of print head 18 to increase and position print head 18 passive, non-extruding state. The actuator 100 is manipulated to cause the print head 18 to rotate about back shaft 72 until front groove 98 engages front shaft 66 which positively stops movement of print head 18 relative to head carriage 34 such that print head 18 is in an active, extruding state. While a voice coil actuator 100 is disclosed, the present disclosure in not limited to a voice coil actuator 100, and other actuators are within the scope of the present disclosure.

As accuracy and knowing position is extremely important when printing a 3D part in a layer by layer manner, the precise position of print head 18 relative to head carriage 34 is monitored to ensure the proper positioning of print head 18 relative to head carriage 34. The present disclosure utilizes optical reflective encoder 120 where reflective encoder target 122 is positioned on front surface 83 of print head 18 and emitter/detector 124 is positioned on and secured to printed circuit board 104. As print head 18 is moved through manipulation of voice coil actuator 100, emitter/detector 124 emits a light beam that is directed to reflective encoder target 122. Reflective encoder target 122 reflects the light beam back, which is detected by emitter/detector 124 and provides positional information about the print head 18. While an optical encoder 120 is disclosed, other position sensors are within the scope of the present disclosure.

In the present disclosure, head carriage 34 and front and back shafts 70, 72 are designed to retain two print heads 18 in a side by side, and compact manner. However it is within the scope of the present disclosure to size head carriage 34 and front and back shafts 70, 72 house one or more print heads 18 and more than two print heads 18.

Figure 7A:
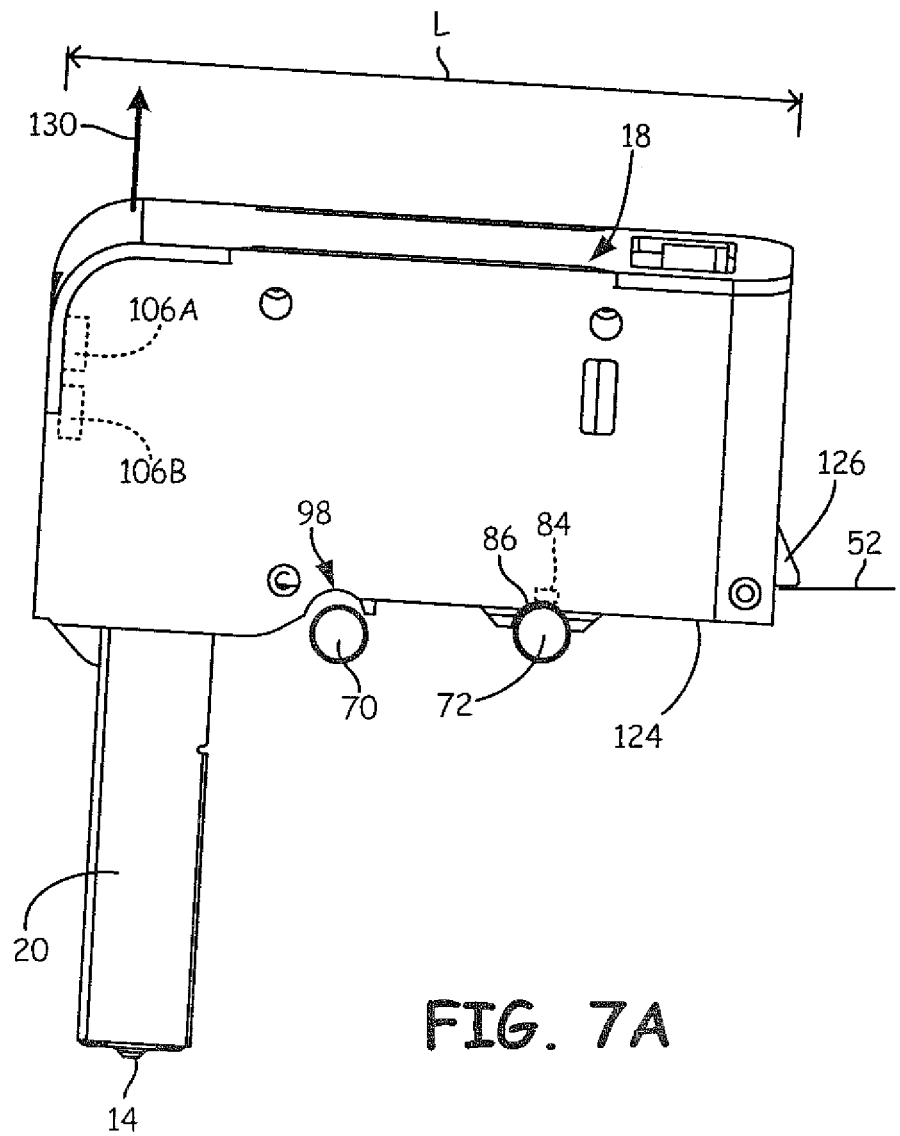
FIG. 7A is a schematic view of a print head magnetically coupled to the head carriage at a maximum pitch.
Figure 7B:
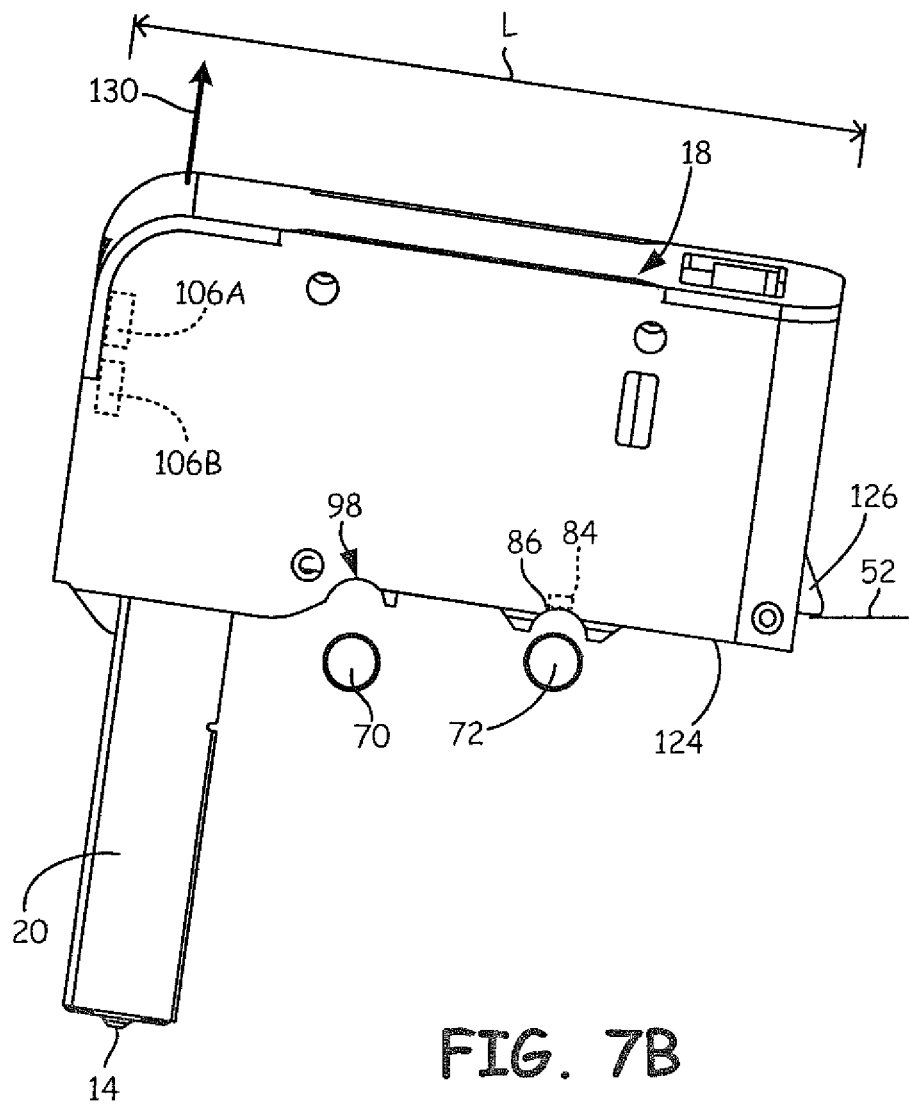
FIG. 7B is a schematic view of the print head de-coupled from the head carriage.

Referring to FIGS. 7A and 7B, each print head 18 includes back portion 124 that extends beyond back groove 84. Back portion 124 includes tab 126 that is configured to engage back portion 52 of bottom wall 50 when print head 18 rotated beyond a range of rotational movement of linear actuator 100, typically with manual force in direction of arrow 130. Print head 18 is capable of being removed from head carriage 34 with manual force by rotating print head 18 about back shaft 72 while maintaining magnetically coupling to back shaft 76 with magnets 84, 86 such that tab 126 of housing 80 engages back portion 52 of bottom wall 50. When tab 126 of housing 80 engages back portion 52 of bottom wall 50, rotational travel of print head 18 is stopped. Applying further manual force to print head 18 in direction of arrow 130 rotates print head 18 about tab 126 of back portion 124 such that the user can utilize mechanical advantage of length L of print head 18 to overcome the magnetic attraction between back shaft 72 and magnets 84, 86. Once the magnetic attraction between the magnets 84, 86 and back shaft 74 is overcome, print head 18 can be simply lifted from the head carriage 34.

As such, the present disclosure includes a much more compact and reliable interface between print head(s) 18 and head carriage 34 while utilizing less complex parts and less mass which results in a more accurate build process relative to a gantry having to carry head carriage and print head(s) with more mass. Further, the present disclosure allow for more compact side to side placement of print heads 18 next to each other relative to prior receptacle and lid designs, as the receptacles cause the print heads to be displaces or positioned a distance away from each other. The compact side to side placement of print head(s) 18 on head gantry 36 effectively increases the ability of an additive manufacturing machine to increase part size without changing the size of the build chamber.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. An additive manufacturing system comprising:
   a gantry configured to move in a build plane;
   a platen configured to support a part being built in a layer by layer process, wherein the platen is configured to move in a direction substantially normal to the build plane;
   a head carriage carried by the gantry, the head carriage comprising:
      a wall having an opening having a length and a width, the opening sized to receive at least one print head;
      a first shaft compositionally comprising at least partially ferromagnetic material, located below the wall; and
      a second shaft spaced from the first shaft, the second shaft located below the wall; and
   at least one print head configured to be positioned within the opening of the wall, the at least one print head comprising:
      a housing; and
      one or more magnets attached to the housing wherein the at least one print head is configured to be coupled to the first shaft through a magnetic coupling between the one or more magnets and the ferromagnetic material such that the print head is configured to move rotationally relative to the head carriage.

2. The additive manufacturing system of claim 1 and wherein the first shaft comprises:
   a main body having a substantially cylindrical configuration from a first end to a second end; and
   a first set of spaced apart slots extending into the main body wherein each of the first set of spaced apart slots comprises:
      spaced apart inwardly tapered side walls; and
      an inner surface connecting the spaced apart side walls.

3. The additive manufacturing system of claim 2 and wherein the housing comprises:
   one or more first magnets secured to the housing and configured to mangetically couple to the first shaft; and
   first and second rotational bearing surfaces extending from the housing wherein each of the first and second rotational bearing surfaces are configured to engage the first set of spaced apart slots on the first shaft.

4. The additive manufacturing system of claim 3 and wherein the housing further comprises:
   one or more second magnets spaced apart from the one or more first magnets, the one or more second magnets are configured to removably magnetically couple with the second shaft such that the print head is positively stopped by the second shaft.

5. The additive manufacturing system of claim 1 and further comprising:
   a support member secured to the wall of the head carriage, wherein the support member is located proximate a first end of the print head when the print head is retained to the head carriage; and
   an actuator comprising:
      a first portion secured to the support member; and
      a second portion secured to the first end of the housing wherein the actuator is located a distance from the magnetic coupling, wherein the actuator is configured to impart a moment force on the print head at the magnetic coupling to cause a pitch of the print head to change relative to the head carriage.

6. The additive manufacturing system of claim 5 and wherein the actuator comprises a voice coil actuator wherein the first portion comprises a voice coil and the second portion comprises permanent magnets.

7. The additive manufacturing system of claim 6 wherein the support member comprises a printed circuit board and wherein the voice coil is electrically coupled to the printed circuit board.

8. The additive manufacturing system of claim 7 and further comprising a position sensor configured to sense a position of the print head relative to the head carriage.

9. he additive manufacturing system of claim 8 and wherein the position sensor comprises an optical reflective encoder, the optical reflective encoder comprises:
   an emitter/detector attached to the printed circuit board, the emitter/detector configured to emit a light beam and sense a reflected light beam; and
   a reflective encoder target attached to the first end of the print head, wherein the reflective encoder is configured to reflect the light beam emitted from the emitter/detector back to the emitter/detector.

10. An additive manufacturing system comprising:
    a gantry configured to move in a build plane;
    a platen configured to support a part being built in a layer by layer process, wherein the platen is configured to move in a direction substantially normal to the build plane;
    a head carriage carried by the gantry wherein the head carriage comprises:
       a wall comprising an opening with a length and a width, the opening sized to receive two or more print heads;
       a first shaft, compositionally at least partially ferromagnetic material, located below the wall; and
       a second shaft spaced from the first shaft, the second shaft located below the wall;
    a first print head comprising:
       a first housing; and
       one or more first magnets attached to the first housing wherein the first print head is configured to be coupled to the head carriage through a magnetic coupling between the one or more first magnets and the ferromagnetic material such that the first print head is configured to move rotationally relative to the head carriage; and a second print head comprising:
  a second housing; and
  one or more second magnets attached to the second housing wherein the second print head is configured to be coupled to the head carriage through a magnetic coupling between the one or more second magnets and the ferromagnetic material such that the second print head is configured to move rotationally relative to the head carriage wherein the magnetic coupling of the first and second print heads to the ferromagnetic material of the first shafts allows the first and second print heads to be positioned side by side.

11. The additive manufacturing system of claim 10 and wherein the first shaft comprises:
  a main body having a substantially cylindrical configuration from a first end to a second end;
  a first set of spaced apart slots extending into the main body wherein each of the first set of spaced apart slots comprises:
    first spaced apart inwardly tapered side walls; and
    a first inner surface connecting the first spaced apart side walls; and
  a second set of spaced apart slots extending into the main body and spaced from the first set of spaced apart slots wherein each of the second set of spaced apart slots comprises:
    second spaced apart inwardly tapered side walls; and
    a second inner surface connecting the second spaced apart side walls.

12. The additive manufacturing system of claim 11 and wherein each of the first and second housings comprises:
  one or more first magnets secured to the housing and configured to magnetically couple to the first shaft; and
  first and second rotational bearing surfaces extending from the housing wherein each of the first and second rotational bearing surfaces are configured to engage the first set of spaced apart slots on the first shaft.

13. The additive manufacturing system of claim 12 and wherein each of the first and second housings further comprises:
  one or more second magnets spaced apart from the one or more first magnets, the one or more second magnets are configured to removably magnetically couple with the second shaft such that the print head is positively stopped by the second shaft.

14. The additive manufacturing system of claim 10 and further comprising:
  a support member secured to the wall of the head carriage, wherein the support member is located proximate a first end of the print head when the print head is retained to the head carriage;
  a first actuator comprising:
    a first portion secured to the support member; and
    a second portion secured to the first end of the first housing wherein the first actuator is located a distance from the magnetic coupling, wherein the first actuator is configured to impart a moment force on the first print head at the magnetic coupling to cause a pitch of the first print head to change relative to the head carriage;
  a second actuator comprising:
    a first portion secured to the support member; and
    a second portion secured to the first end of the second housing wherein the second actuator is located a distance from the magnetic coupling, wherein the second actuator is configured to impart a moment force on the second print head at the magnetic coupling to cause a pitch of the second print head to change relative to the head carriage; and
  wherein the first and second actuators are independently controllable.

15. The additive manufacturing system of claim 14 and wherein the first and second actuators each comprise comprises a voice coil actuator wherein the first portion comprises a voice coil and the second portion comprises permanent magnets.

16. The additive manufacturing system of claim 14 and further comprising:
  a first position sensor configured to sense a position of the first print head relative to the head carriage; and
  a second position sensor configured to sense a position of the second print head relative to the head carriage.

17. The additive manufacturing system of claim 16 and wherein the first and second position sensors each comprise an optical reflective encoder, the optical reflective encoder comprises:
  an emitter/detector attached to the support member, the emitter/detector configured to emit a light beam and sense a reflected light beam; and
  a reflective encoder target attached to the print head, wherein the reflective encoder is configured to reflect the light beam emitted from the emitter/detector back to the emitter/detector.

18. An additive manufacturing system comprising:
  a gantry configured to move in a build plane;
  a platen configured to support a part being built in a layer by layer process, wherein the platen is configured to move in a direction substantially normal to the build plane;
  a head carriage carried by the gantry wherein the head carriage comprises:
    a wall having an opening having a length and a width, the opening sized to receive two or more print heads;
    a first shaft, compositionally at least partially ferromagnetic material, located below the wall; and
    a second shaft spaced from the first shaft, the second shaft located below the wall;
  at least one print head comprising:
    a housing having a front end and a back end wherein the back end is configured to be positioned over the wall when the print head is secured to the head carriage, the housing comprising a head carriage engaging surface comprising:
      spaced apart rotational bearing surfaces between the front end and the back end, the rotational bearing surfaces configured to engage the first shaft such that a pitch of the at least one print head relative to the head carriage can be manipulated; and
      one or more magnets attached to the housing between the spaced apart rotational bearing surfaces wherein the at least one print head is configured to be coupled to the head carriage through a magnetic coupling between the one or more magnets and the first shaft and wherein the at least one print head is configured to be removed from the head carriage by applying a force proximate the front end to rotate the at least one print head about the first shaft while maintaining the magnet coupling until the back end of the housing engages the bottom wall of the print housing and wherein additional force separates the one or more magnets from the first shaft such that the at least one print head can be removed from the head carriage.

19. The additive manufacturing system of claim 18 and further comprising:
a support member secured to the head carriage proximate the front end of the print head; and
a voice coil actuator comprising:
a voice coil secured and electrically coupled to the support member; and
a permanent magnet secured to the print head wherein the voice coil actuator is located above the magnetic coupling, wherein the voice coil actuator is configured to impart a moment force on the print head at the magnetic coupling to cause a pitch of the at least one print head relative to the head carriage to change.

* * * * *